United States Patent
Eilertsen et al.

(10) Patent No.: US 11,714,004 B2
(45) Date of Patent: Aug. 1, 2023

(54) MEASUREMENTS USING SYSTEMS HAVING MULTIPLE SPECTROMETERS

(71) Applicant: ams Sensors Singapore Pte. Ltd., Singapore (SG)

(72) Inventors: James Eilertsen, Zurich (CH); Javier Miguel Sánchez, Zurich (CH)

(73) Assignee: AMS Sensors Singapore Pte. Ltd., Singapore (SG)

( * ) Notice: Subject to any disclaimer, the term of this patent is extended or adjusted under 35 U.S.C. 154(b) by 155 days.

(21) Appl. No.: 17/289,299

(22) PCT Filed: Nov. 13, 2019

(86) PCT No.: PCT/SG2019/050558
§ 371 (c)(1),
(2) Date: Apr. 28, 2021

(87) PCT Pub. No.: WO2020/101575
PCT Pub. Date: May 22, 2020

(65) Prior Publication Data
US 2021/0389179 A1    Dec. 16, 2021

Related U.S. Application Data

(60) Provisional application No. 62/767,876, filed on Nov. 15, 2018.

(51) Int. Cl.
*G01J 3/42* (2006.01)
*G01J 3/02* (2006.01)

(52) U.S. Cl.
CPC .............. *G01J 3/42* (2013.01); *G01J 3/0272* (2013.01); *G01J 2003/425* (2013.01)

(58) Field of Classification Search
CPC ....... G01J 2003/425; G01J 3/0272; G01J 3/42
See application file for complete search history.

(56) References Cited

U.S. PATENT DOCUMENTS

2007/0228280 A1* 10/2007 Mueller ............. G01N 21/3581
                                                        250/341.1
2007/0235658 A1* 10/2007 Zimdars ............. G01N 21/3586
                                                        250/390.07
(Continued)

FOREIGN PATENT DOCUMENTS

| DE | 102007024334 A1 | 11/2008 |
| EP | 0499312 A1 | 8/1992 |
| WO | 2017098053 A1 | 6/2017 |

OTHER PUBLICATIONS

"Systemic characterization of a 1550 nm microelectromechanical (MEMS)-tunable vertical-cavity surface-emitting laser (VCSEL) with 7.92 THz tuning range for terahertz photomixing systems", J. of App. Phys 123, 023106 (2018) (Year: 2018).*

(Continued)

*Primary Examiner* — Hina F Ayub
(74) *Attorney, Agent, or Firm* — Viering, Jentschura & Partner mbB

(57) ABSTRACT

An example system includes a first spectrometer, a second spectrometer, and an electronic control device communicatively coupled to the first spectrometer and the second spectrometer. The first spectrometer is operable to emit first light using a first light source towards a sample region between the first spectrometer and the second spectrometer. The first spectrometer is also operable to measure first reflected light reflected using a first photodetector from an object in the sample region. The second spectrometer is operable to measure first transmitted light transmitted through the object using a second photodetector. The electronic control device is operable to determine, based on at least one of the measured first reflected light or the measured first transmitted light, a spectral distribution of light corresponding to the object.

20 Claims, 7 Drawing Sheets

(56) References Cited

U.S. PATENT DOCUMENTS

2012/0305772 A1* 12/2012 Tripodi ................ G01N 21/553
  250/338.4
2018/0058929 A1  3/2018 Ramer et al.

OTHER PUBLICATIONS

International Search Report and Written Opinion for Application No. PCT/SG2019/050558 dated Feb. 19, 2020 (11 pages).
International Preliminary Report on Patentability for Application No. PCT/SG2019/050558 dated May 18, 2021 (9 pages).

* cited by examiner

MEASUREMENTS USING SYSTEMS HAVING MULTIPLE SPECTROMETERS

TECHNICAL FIELD

The disclosure relates to spectrometers.

BACKGROUND

A spectrometer is an instrument used to measure a light spectrum of sample light (e.g., to determine the spectral components of ultraviolet, visible, and/or infrared light). In some cases, spectrometers can determine the intensity of light as a function of wavelength or of frequency.

Spectrometers can be used for a variety of different applications. For example, spectrometers can be used to conduct environmental analyses, industrial monitoring, color measurements, and pharmacological studies.

A light spectrum can be measured in different ways, such as through direct measurement or indirect measurement. As an example, a spectrometer configured for direct measurement can separate different wavelengths of light spatially (e.g., using wavelength dispersive devices, such as diffractive gratings or prisms), and measure the power distribution of each wavelength of light individually (e.g., to "directly" measure the spectrum with respect to specific wavelengths).

As another example, a spectrometer configured for indirect measurement can modulate light according to a series of known spectral modulation patterns, and obtain measurements of the modulated light. Each measurement provides information carried by multiple wavelengths and according to different weights, and can be used to reconstruct the spectrum of the original light (e.g., using a multiplexing technique).

SUMMARY

A spectrometer system can be used to determine information regarding a sample (e.g., an object) based on the properties of light reflected from and/or transmitted through the sample. As an example, a spectrometer system can operate according to a "reflectance mode" by emitting light (e.g., light having known spectral properties) toward the sample, and measuring light reflected from the sample and returning to the spectrometer system. The spectrometer system can determine the spectral properties of the reflected light (e.g., the distribution of light with respect to a range of wavelengths), and determine information regarding the sample based on these measurements. As another example, a spectrometer system can operate according to a "transmittance" mode by emitting light toward the sample, and measuring light transmitted through the sample (e.g., light that emerges from the sample). The spectrometer system can determine the spectral properties of the transmitted light, and determine information regarding the sample based on these measurements. In some cases, the spectrometer system can determine the physical shape or profile of the sample, the characteristics of the surface of the sample, and/or the composition of the sample.

In some cases, a spectrometer system includes two or more individual spectrometers, each of which can selectively operate according to the reflectance mode, the transmittance mode, or both in a sequential or concurrent manner. This can be beneficial, for example, as the characteristics of reflected light may reveal certain information regarding the sample, whereas the characteristics of transmitted light may reveal different information regarding the sample. Thus, the spectrometer system can selectively operate according to different modes to analyze the sample in a more comprehensive manner.

Further, in some cases, certain types of samples may be more suitable for analysis according to a reflectance mode rather than a transmittance mode, or vice versa. For example, a transparent or translucent sample may transmit a substantial amount of light, but may reflect a comparatively smaller amount of light. If the amount of reflected light is too small, a spectrometer system may have difficulty obtaining accurate and/or precise measurements in a reflectance mode. In these situations, the spectrometer system can selectively operate according to a transmittance mode instead. As another example, an opaque sample may reflect a substantial amount of light, but may transmit a comparatively smaller amount of light. If the amount of transmitted light is too small, a spectrometer system may have difficulty obtaining accurate and/or precise measurements in a transmittance mode. In these situations, the spectrometer system can selectively operate according to a transmittance mode instead. Thus, the spectrometer system can analyze a wide array of sample in a more accurate and precise manner.

In an aspect, a system includes a first spectrometer, a second spectrometer, and an electronic control device communicatively coupled to the first spectrometer and the second spectrometer. The first spectrometer includes a first light source and a first photodetector. The second spectrometer includes a second light source and a second photodetector. The first light source is operable to emit first light towards a sample region between the first spectrometer and the second spectrometer. The first photodetector is operable to measure first reflected light reflected from an object in the sample region. The second photodetector is operable to measure first transmitted light transmitted through the object. The electronic control device is operable to determine, based on at least one of the measured first reflected light or the measured first transmitted light, a spectral distribution of light corresponding to the object.

Implementations of this aspect can include one or more of the following features.

In some implementations, the second light source can be operable to emit second light towards the sample region. The second photodetector can be operable to measure second reflected light reflected from the object. The first photodetector can be operable to measure second transmitted light transmitted through the object. The electronic control device can be operable to determine, based further on at least one of the measured second reflected light or the measured second transmitted light, the spectral distribution of light corresponding to the object.

In some implementations, the first light source can be operable to emit the first light during a first time period. The second light source can be operable to emit the second light during a second time period different from the first time period.

In some implementations, the first light source can be operable to emit the first light concurrently with the second light source emitting the second light.

In some implementations, the electronic control device can be operable to determine the spectral distribution of light corresponding to the object by determining, at a first time, a first combination of the second transmitted and the first reflected light using the first photodetector, and determining, at the first time, a first combination of the first transmitted light and the second reflected light using the second photodetector.

In some implementations, the electronic control device can be operable to determine the spectral distribution of light corresponding to the object by determining, at a second time, a second combination of the second transmitted light and the first reflected light using the first photodetector, and determining, at the second time, a second combination of the first transmitted light and the second reflected light reflected from the object using the second photodetector.

In some implementations, the electronic control device can be operable to determine the spectral distribution of light corresponding to the object by determining a first variation between (i) the first combination of the second transmitted and the first reflected light and (ii) the second combination of the second transmitted light and the first reflected light using the first photodetector, and determining a second variation between (i) first combination of the first transmitted light and the second reflected light using the second photodetector and (ii) the second combination of the first transmitted light and the second reflected light reflected from the object using the second photodetector.

In some implementations, the electronic control device can be operable to determine the spectral distribution of light corresponding to the object by determining a correlation between the first variation and the second variation, and determining the spectral distribution of light based on the correlation.

In some implementations, the first light source can be operable to emit the first light within a first range of wavelengths. The second light source can be operable to emit second light within a second range of wavelengths different from the first range of wavelengths.

In some implementations, the first light source can be operable to emit the first light within a first range of wavelengths. The second light source can be operable to emit the second light within the first range of wavelengths.

In some implementations, the system can include a receptacle disposed in the sample region, the receptacle being configured to hold the object.

In some implementations, the system can include a mobile device including at least one of the first spectrometer or the second spectrometer.

In some implementations, the system can include a first mobile device including the first spectrometer, and a second mobile device including the second spectrometer.

In another aspect, a method can be performed to determine a spectral distribution of light. According to the method, first light is emitted using a first light source of a first spectrometer towards a sample region between the first spectrometer and a second spectrometer. First reflected light reflected from an object in the sample region is measured using a first photodetector of the first spectrometer. First transmitted light transmitted through the object is measured using a second photodetector of the second spectrometer. A spectral distribution of light corresponding to the object is determined determining using an electronic control device based on at least one of the measured first reflected light or the measured first transmitted light.

Implementations of this aspect can include one or more of the following features.

In some implementations, the method can include emitting, using a second light source of the second spectrometer, second light towards the sample region, measuring, using the second photodetector of the second spectrometer, second reflected light reflected from the object, measuring, using the first photodetector of the first spectrometer, second transmitted light transmitted through the object, and determining, using the electronic control device, the spectral distribution of light corresponding to the object based further on at least one of the measured second reflected light or the measured second transmitted light.

In some implementations, the first light can be emitted by the first light source during a first time period. The second light can be emitted by the second light source during a second time period different from the first time period.

In some implementations, the first light can be emitted by the first light source concurrently with the second light source emitting the second light.

In some implementations, determining the spectral distribution of light corresponding to the object can include determining, at a first time, a first combination of the second transmitted and the first reflected light using the first photodetector, and determining, at the first time, a first combination of the first transmitted light and the second reflected light using the second photodetector.

In some implementations, determining the spectral distribution of light corresponding to the object can include determining, at a second time, a second combination of the second transmitted light and the first reflected light using the first photodetector, and determining, at the second time, a second combination of the first transmitted light and the second reflected light reflected from the object using the second photodetector.

In some implementations, determining the spectral distribution of light corresponding to the object can include determining a first variation between (i) the first combination of the second transmitted and the first reflected light and (ii) the second combination of the second transmitted light and the first reflected light using the first photodetector, and determining a second variation between (i) first combination of the first transmitted light and the second reflected light using the second photodetector and (ii) the second combination of the first transmitted light and the second reflected light reflected from the object using the second photodetector.

In some implementations, determining the spectral distribution of light corresponding to the object can include determining a correlation between the first variation and the second variation, and determining the spectral distribution of light based on the correlation.

In some implementations, the first light can be emitted by the first light source within a first range of wavelengths. The second light can be emitted by the second light source within a second range of wavelengths different from the first range of wavelengths.

In some implementations, the first light can be emitted by the first light source within a first range of wavelengths. The second light can be emitted by the second light source within the first range of wavelengths.

The details of one or more implementations are set forth in the accompanying drawings and the description below. Other features and advantages will be apparent from the description and drawings, and from the claims.

DETAILED DESCRIPTION

This disclosure describes implementations of a spectrometer system having two or more individual spectrometers, each of which can selectively operate according to a reflectance mode, a transmittance mode, or both in a sequential or concurrent manner. In some cases, the spectrometer system can be used to analyze a sample in a more comprehensive manner (e.g., compared to a spectrometer system having a single spectrometer and/or a spectrometer system that can operate according to only one of a reflectance mode or a transmittance mode). In some cases, the spectrometer system can be used to analyze a wider array of sample in a more accurate and precise manner (e.g., compared to a spectrometer system having a single spectrometer and/or a spectrometer system that can only operate according to only one of a reflectance mode or a transmittance mode).

Figure 1:
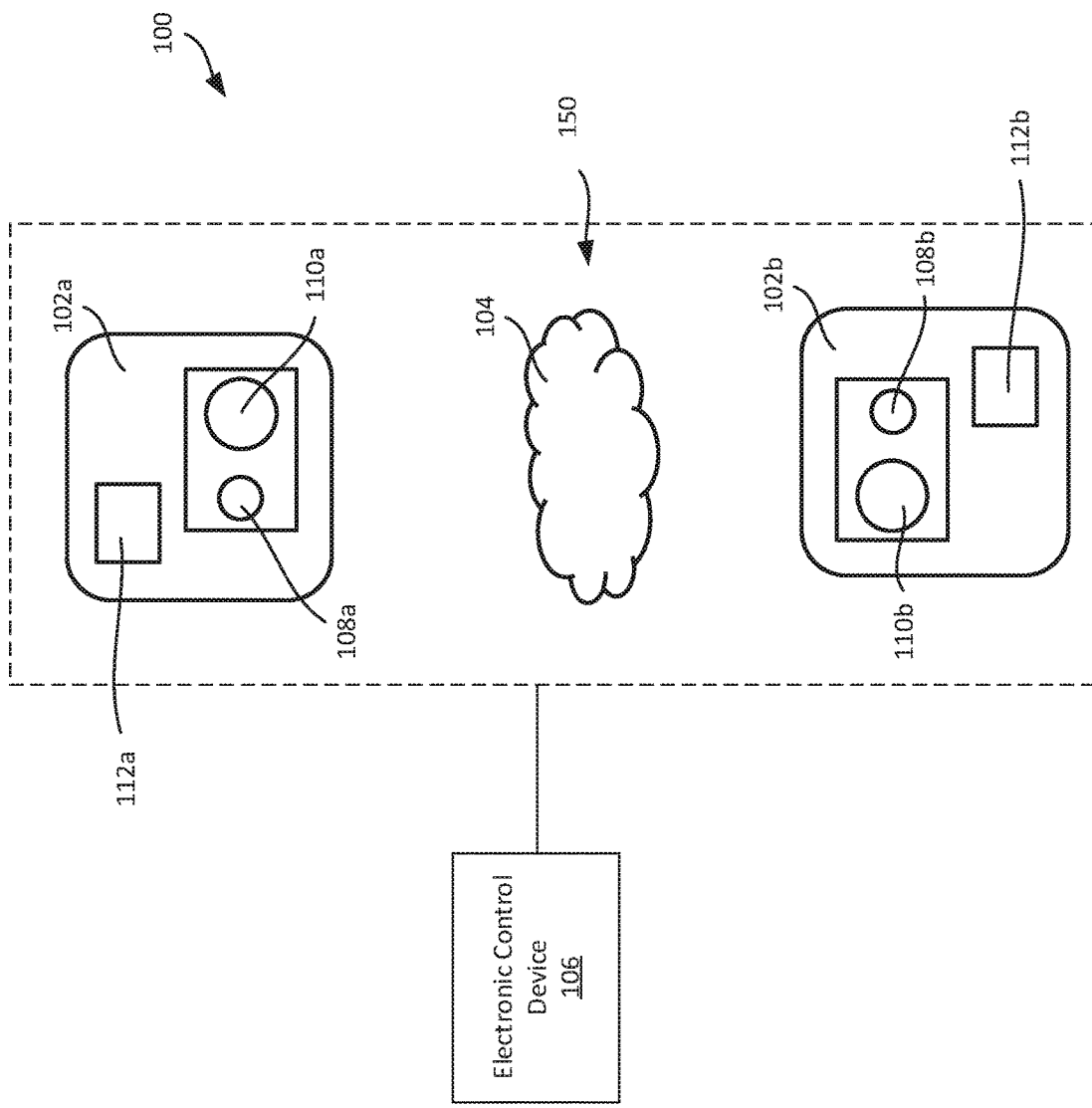
FIG. 1 is a schematic diagram of an example spectrometer system.

FIG. 1 shows an example spectrometer system 100. The spectrometer system 100 can be implemented as a stand-alone device (e.g., as an individual instrument), or as part of another device (e.g., as a part of a multi-purpose device). In some cases, the spectrometer system 100 can be implemented as a part of a mobile device, such as a smart phone, a tablet computer, or a wearable computer.

As shown in FIG. 1, the spectrometer system 100 includes a first spectrometer 102*a*, a second spectrometer 102*b*, and an electronic control device 106. In an example usage of the spectrometer system 100, at least one of the spectrometers 102*a* and 102*b* generates light, which is emitted toward a sample 104 (e.g., an object positioned in a sample region 150 between the first spectrometer 102*a* and the second spectrometer 102*b*). Further, at least one of the spectrometers 102*a* and 102*b* measures the spectral distribution of light that reflects from the sample 104 and/or is transmitted through the sample 104. The electronic control device 106 determines information regarding the sample 104 based on the measurements.

The spectrometer 102*a* and 102*b* includes respective light sources 108*a* and 108*b*, respective photodetectors 110*a* and 110*b*, and respective transceivers 112*a* and 112*b*.

The light sources 108*a* and 108*b* are components operable to generate light and emit the light toward the sample region 150. Each light source 108*a* or 108*b* can include one or more light emitting elements. As an example, each light source 108*a* or 108*b* can include one or more light emitting diodes (LEDs), vertical cavity surface emitting lasers (VCSELs), organic light emitting diodes (OLEDs), or other devices that selectively generate light.

The photodetectors 110*a* are 110*b* are components that measure the characteristics of incident light. The photodetectors 110*a* and 110*b* can measure reflected light (e.g., light reflected from the sample 104), transmitted light (e.g., light transmitted through the sample 104), or a combination of reflected and transmitted light. As an example, when the light source 108*a* emits light, the photodetector 110*a* may measure light reflecting from the sample 104 and/or the photodetector 110*b* may measure light transmitting through the sample 104. As another example, when the light source 108*b* emits light, the photodetector 110*b* may measure light reflecting from the sample 104 and/or the photodetector 110*a* may measure light transmitting through the sample 104. In some cases, the photodetectors 110*a* and 110*b*. As another example, when both of the light sources 108*a* and 108*b* emit light, each of the photodetectors 110*a* and 110*b* may measure both light reflecting from the sample 104 and light transmitting through the sample 104.

The spectrometer system 100 can measure various characteristics of the reflected light using the photodetectors 110*a* and 110*b*. As an example, using the photodetectors 110*a* and 110*b*, the spectrometer system 100 can measure the intensity of the reflected light and/or the spectral characteristics of the reflected light. In some cases, the spectrometer system 100 is operable to measure light using the photodetector 110*a* and/or the photodetector 110*b* according to one or more discrete points in time. In some cases, the spectrometer system 100 is operable to measure light using the photodetector 110*a* and/or the photodetector 110*b* continuously, periodically, intermittently, or according to some other pattern.

The transceivers 112*a* and 112*b* are components that transmit and/or receive electronic information. As an example, the transceiver 112*a* can transmit information from the spectrometer 102*a* to other components of the spectrometer system 100 (e.g., the spectrometer 102*b* and/or the electronic control device 106) and/or to systems remote from the spectrometer system 100 (e.g., a client system, a server system, etc.). As another example, the transceiver 112*a* can receive information from other components of the spectrometer system 100 and/or from systems remote from the spectrometer system 100. As another example, the transceiver 112*b* can transmit information from the spectrometer 102*b* to other components of the spectrometer system 100 (e.g., the spectrometer 102*a* and/or the electronic control device 106) and/or to systems remote from the spectrometer system 100 (e.g., a client system, a server system, etc.). As another example, the transceiver 112*b* can receive information from other components of the spectrometer system 100 and/or from systems remote from the spectrometer system 100. In some cases, the transceivers 112*a* and 112*b* are wireless transceivers (e.g., Wi-Fi radios, Bluetooth radios, cellular radios, etc.). In some cases, the transceivers 112*a* and 112*b* are wired transceivers (e.g., serial transceivers, universal serial bus (USB) transceivers, Ethernet transceivers, etc.).

The electronic control device 106 can control the operation of spectrometer 102*a* and/or the spectrometer 102*b*. For example, the electronic control device 106 can be communicatively coupled to the spectrometers 102*a* and 102*b* (e.g., via the transceivers 112*a* and 112*b*) and selectively can turn on or off the light sources 108*a* and 108*b* (e.g., to generate light during selected periods of time, such as during a measurement operation) and/or specify the characteristics of the generated light (e.g., to generate light according to a specific pattern, spectral composition, etc.). Further, the electronic control device 106 can obtain information describing the characteristics of the emitted light (e.g., the time at which the light is emitted, the intensity of the emitted light, the spectral composition of the emitted light, the phase of the emitted light, etc.). As another example, the electronic control device 106 selectively can turn on or off the photodetectors 110*a* and 110*b* (e.g., to measure light during selected periods of time, such as during a measurement operation), and obtain information describing the characteristics of the measured light (e.g., the time at which the light is measured, the intensity of the measured light, the spectral composition of the measured light, the phase of the measured light, etc.).

In some cases, the electronic control device 106 is implemented as a device separate from the spectrometers 102a and/or 102b. For example, the electronic control device 106 can be a computer system (e.g., a client computer system or a server computer system) or computer processor separate and distinct from the spectrometers 102a and/or 102b. In some cases, the electronic control device 106 can be implemented as a part of the spectrometers 102a and/or 102b. For example, the electronic control device 106 can be incorporated in one of the spectrometers 102a or 102b.

In some cases, some or all of the components of the spectrometer 102a can be identical or substantially identical to those in the spectrometer 102b. For example, the light sources 108a and 108b can be identical or substantially identical, the photodetectors 110a and 110b can be identical or substantially identical, and/or the transceivers 112a and 112b can identical or substantially identical. Further, the configuration of the spectrometers 102a and 102b (e.g., the relative arrangement of the components spectrometers) can be identical or substantially identical. This configuration can be useful, for example, in simplifying the process for manufacturing the spectrometer system 100 (e.g., the spectrometers 102a and 102b can be produced by the same or similar process, rather than by two different processes). Further, this configuration enables the spectrometer system 100 to be used according to several different operating modes, without requiring that the sample 104 be positioned in a specific way in the sample region 150.

Figure 2:
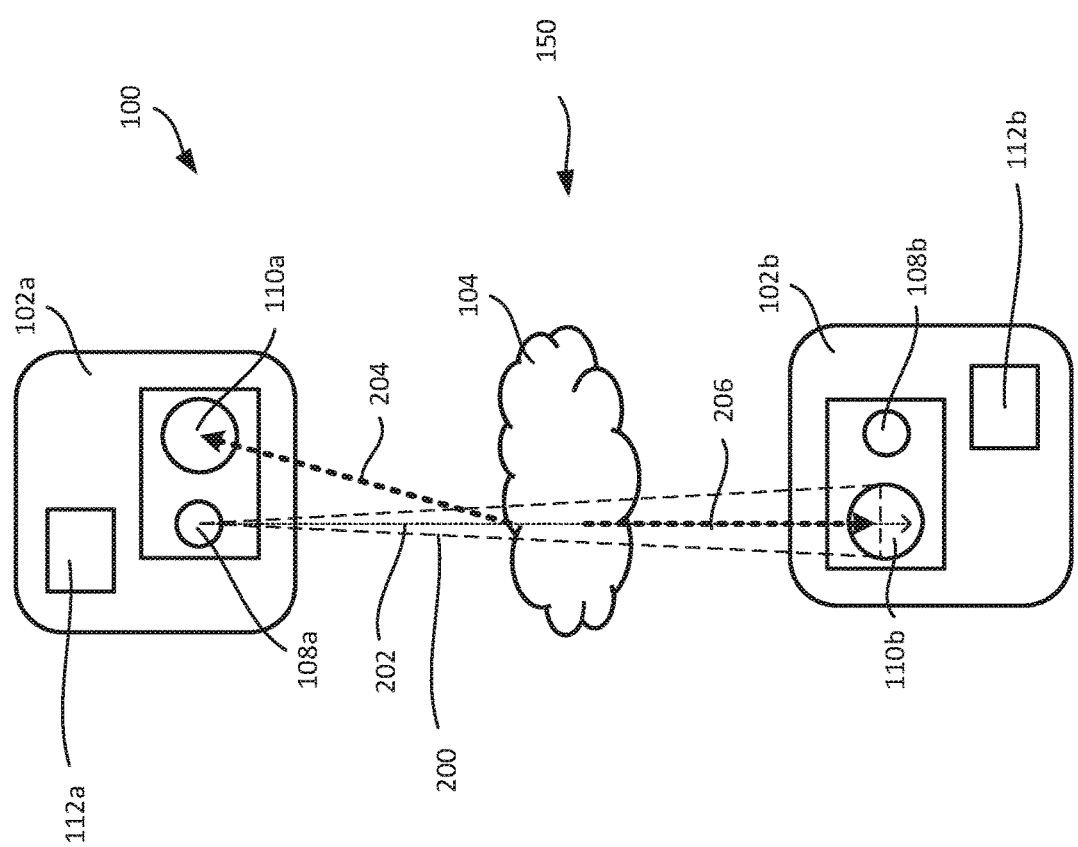
FIG. 2 is a schematic diagram of an example operating mode of a spectrometer system.

The spectrometer system 100 can operate according to one or more different operating modes to obtain information regarding a sample. As an example, FIG. 2 shows the spectrometer system 100 operating according to a first mode of operation to analyze both the light reflected by the sample 104 and the light transmitted by the sample 104. For ease of illustration, portions of the spectrometer system 100 (e.g., the electronic control device 106) have been omitted in FIG. 2.

In this first operating mode, the first spectrometer 102a emits light 200 towards the sample 104 (e.g., positioned in the sample region 150 between the first spectrometer 102a and the second spectrometer 102b). For example, the first spectrometer 102a can emit the light 200 according to an axis of propagation 202 extending from the light source 108a of the first spectrometer 102a to the photodetector 110b of the second spectrometer 102b. In some cases, the first spectrometer 102a can emit the light 200 according to a particular wavelength (e.g., $\lambda_{emitted_1}$) or range of wavelengths (e.g., between $\lambda_{emitted_1}$ to $\lambda_{emitted_2}$) and/or according to other particular spectral properties (e.g., a particular spectral distribution).

In some cases, at least some of the light 200 incident on the sample 104 may reflect from the sample 104 (e.g., in the form of reflected light 204). The first spectrometer 102a can measure the properties of the reflected light 204 using the photodetector 110a.

In some cases, at least some of the light 200 incident on the sample 104 may be transmitted through the sample 104 (e.g., in the form of transmitted light 206). The second spectrometer 102b can measure the properties of the transmitted light 206 using the photodetector 110b The measurements obtained by the spectrometers 102a and 102b can be aggregated together. For example, the spectrometers 102a and 102b can transmit the measurements to the electronic control device 106 and/or to one another using their respective transceivers 112a and 112b.

In this operating mode, the spectrometer system 100 can analyze both the light reflected by the sample 104 and the light transmitted by the sample 104. This can be useful, for example, as the characteristics of reflected light 204 may reveal certain information regarding the sample 104, whereas the characteristics of transmitted light 206 may reveal different information regarding the sample 104. By obtaining information regarding both types of light, spectrometer system 100 can analyze the sample in a more comprehensive manner.

Although FIG. 2 depicts the first spectrometer 102a emitting light toward the sample 104, this need not be the case. In some case, the second spectrometer 102b can emit light instead of the first spectrometer (e.g., using the light source 108b). Further, the second spectrometer 102b can measure light reflected from the sample 104 (e.g., using the photodetector 110b), and the first spectrometer 102b can measure light transmitted through the sample 104 (e.g., using the photodetector 110a).

In some cases, the spectrometers 102a and 102b can alternate emitting light toward the sample 104. While emitting light, a spectrometer 102a or 102b can measure light reflected from the sample. While not emitting light, a spectrometer 102a or 102b can measure light transmitted through the sample. The measurements obtained by the spectrometer 102a and 102b can be aggregated together to improve the accuracy and/or precision of the measurements.

Figure 3:
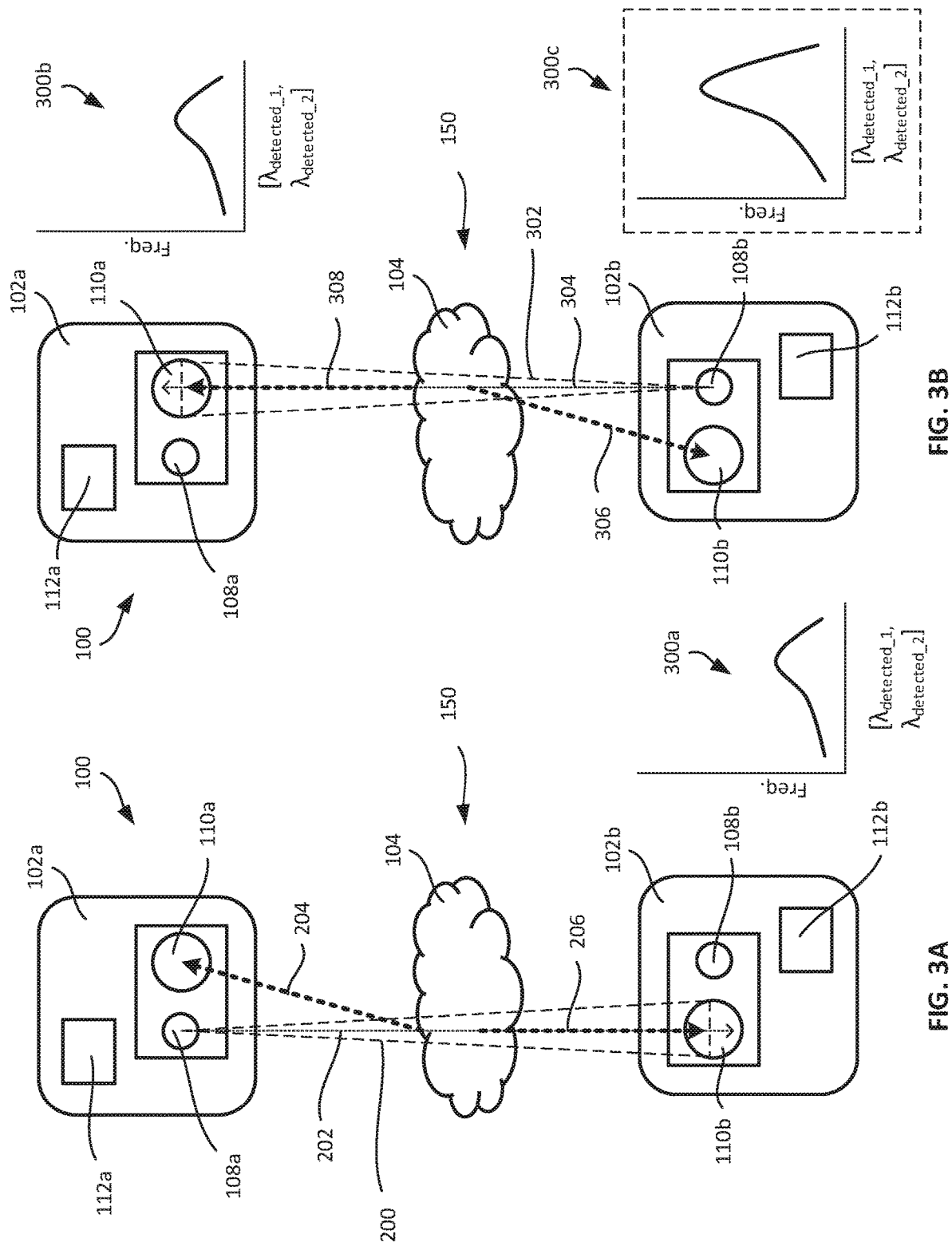
FIGS. 3A and 3B are schematic diagrams of another example operating mode of a spectrometer system.

For example, FIGS. 3A and 3B show the spectrometer system 100 operating according to another mode of operation to analyze both the light reflected by the sample 104 and the light transmitted by the sample 104. For ease of illustration, portions of the spectrometer system 100 (e.g., the electronic control device 106) have been omitted in FIGS. 3A and 3B.

During a first phase of this operating mode (shown in FIG. 3A), the spectrometer system 100 operates in similar manner as described with respect to FIG. 2. For example, the first spectrometer 102a emits light 200 towards the sample 104 (e.g., positioned in the sample region 150 between the first spectrometer 102a and the second spectrometer 102b). Further, the first spectrometer 102a can emit the light 200 according to an axis of propagation 202 extending from the light source 108a of the first spectrometer 102a to the photodetector 110b of the second spectrometer 102b. In some cases, the first spectrometer 102a can emit the light 200 according to a particular wavelength (e.g., $\lambda_{emitted_1}$) or range of wavelengths (e.g., between $\lambda_{emitted_1}$ to $\lambda_{emitted_2}$) and/or according to other particular spectral properties (e.g., a particular spectral distribution).

In some cases, at least some of the light 200 incident on the sample 104 may reflect from the sample 104 (e.g., in the form of reflected light 204). The first spectrometer 102a can measure the properties of the reflected light 204 using the photodetector 110a.

In some cases, at least some of the light 200 incident on the sample 104 may be transmitted through the sample 104 (e.g., in the form of transmitted light 206). The second spectrometer 102b can measure the properties of the transmitted light 206 using the photodetector 110b. As an illustrative example, the measured properties of the transmitted light 206 can be represented as a histogram 300a (e.g., indicating the wavelengths of measured light along the horizontal axis, and the frequency or intensity of measured light on the vertical axis). In some cases, the measurements can be obtained with respect to a particular range of wavelengths $\lambda_{detected_1}$ to $\lambda_{detected_2}$.

During a second phase of this operating mode (shown in FIG. 3B), the spectrometer system 100, the first spectrometer 102a discontinues emitting light 200, whereas, the second spectrometer 102b emits light 302 towards the sample 104 (e.g., using the light source 108b). Further, the second spectrometer 102b can emit the light 302 according to an axis of propagation 304 extending from the second light source 108b of the second spectrometer 102b to the photodetector 110a of the first spectrometer 102a. In some cases, the second spectrometer 102b can emit the light 302 according to the same wavelength or range of wavelengths as the light 200 emitted by the first spectrometer 102a (e.g., $\lambda_{emitted_1}$, or between $\lambda_{emitted_1}$ to $\lambda_{emitted_2}$) and/or according to the same spectral properties as the light 200 emitted by the first spectrometer 102a. In some cases, the second spectrometer 102b can emit the light 302 according to a different wavelength or range of wavelengths as the light 200 emitted by the first spectrometer 102a (e.g., $\lambda_{emitted_3}$, or between $\lambda_{emitted_3}$ to $\lambda_{emitted_4}$) and/or according to different spectral properties as the light 200 emitted by the first spectrometer 102a.

In some cases, at least some of the light 302 incident on the sample 104 may reflect from the sample 104 (e.g., in the form of reflected light 306). The second spectrometer 102b can measure the properties of the reflected light 306 using the photodetector 110b.

In some cases, at least some of the light 302 incident on the sample 104 may be transmitted through the sample 104 (e.g., in the form of transmitted light 308). The first spectrometer 102a can measure the properties of the transmitted light 308 using the photodetector 110a. As an illustrative example, the measured properties of the transmitted light 308 can be represented as a histogram 300b (e.g., indicating the wavelengths of measured transmitted light along the horizontal axis, and the frequency or intensity of measured transmitted light on the vertical axis). In some cases, the measurements can be obtained with respect to the same range of wavelengths $\lambda_{detected_1}$ to $\lambda_{detected_2}$ as in the measurements of the second photodetector 102b during the first phase.

The measurements obtained by the spectrometers 102a and 102b can be aggregated together. For example, the spectrometers 102a and 102b can transmit the measurements to the electronic control device 106 and/or to one another using their respective transceivers 112a and 112b. Further, the measurements can be combined together (e.g., added together) into a single data set. This can be useful, for example, as it increases the effective sample size of the measurements, and can improve the accuracy and/or precision of the measurements. As an illustrative example, the measurements of the histograms 300a and 300b were obtained according to a common range of wavelengths $\lambda_{detected_1}$ to $\lambda_{detected_2}$. These measurements can be added together to obtain a combined histogram 300c, with combined measurements within the common range of wavelengths $\lambda_{detected_1}$ to $\lambda_{detected_2}$.

In some cases, the spectrometers 102a and 102b can alternate between emitting light and measuring transmitted light one or more times (e.g., alternate between the phases shown in FIGS. 3A and 3B one or more times). This can be useful, for example, as obtaining multiple samples can increase the accurate and/or precision of the measurements further. As an example, the spectrometers 102a and 102b can cycle between the two phases one, two, three, four, or more times.

Further, although FIGS. 3A and 3B only depict the aggregation of measurements with respect to transmitted light, measurements with respect to reflected light also can be aggregated in a similar manner. For example, during the first phase of this operating mode (e.g., as shown in FIG. 3A), the first spectrometer 102a can measure reflected light 204 using the photodetector 110a. Further, during the second phase of this operating mode (e.g., as shown in FIG. 3B), the second spectrometer 102b can measure reflected light 306 using the photodetector 110b. Similarly, the spectrometers 102a and 102b can measure the reflected light according to a common range of wavelengths. These measurements can be combined together. For instance, the measurements can be added together to obtain a combined histogram (e.g., with combined measurements within the common range of wavelengths).

In the example shown in FIGS. 3A and 3B, the spectrometers 102a and 102b measure light according to a common range of wavelengths. However, this need not be the case. In some implementations, the spectrometers 102a and 102b measure light according to different ranges of wavelengths (e.g., different overlapping ranges, non-overlapping ranges, contiguous ranges, etc.). The measurements can be aggregated together to obtain a single data set with samples spanning a wider range of wavelengths than might otherwise be obtained by a single spectrometer alone.

Figure 4:
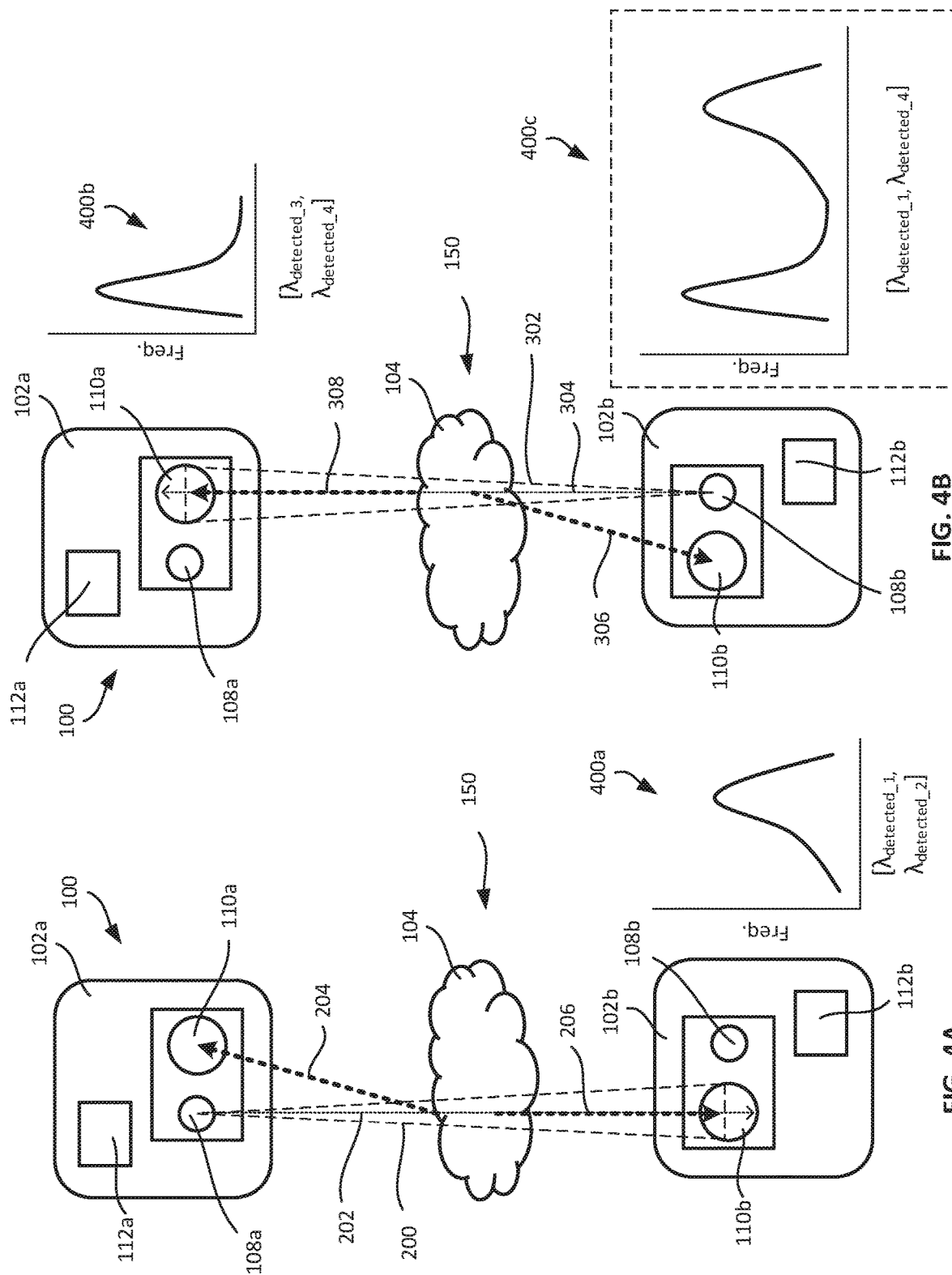
FIGS. 4A and 4B are schematic diagrams of another example operating mode of a spectrometer system.

For example, FIGS. 4A and 4B show the spectrometer system 100 operating according to another mode of operation to analyze both the light reflected by the sample 104 and the light transmitted by the sample 104. For ease of illustration, portions of the spectrometer system 100 (e.g., the electronic control device 106) have been omitted in FIGS. 4A and 4B.

During a first phase of this operating mode (shown in FIG. 4A), the spectrometer system 100 operates in similar manner as described with respect to FIG. 3A. For example, the first spectrometer 102a emits light 200 towards the sample 104 (e.g., positioned in the sample region 150 between the first spectrometer 102a and the second spectrometer 102b). Further, the first spectrometer 102a can emit the light 200 according to an axis of propagation 202 extending from the light source 108a of the first spectrometer 102a to the photodetector 110b of the second spectrometer 102b. In some cases, the first spectrometer 102a can emit the light 200 according to a particular wavelength (e.g., $\lambda_{emitted_1}$) or range of wavelengths (e.g., between $\lambda_{emitted_1}$ to $\lambda_{emitted_2}$) and/or according to other particular spectral properties (e.g., a particular spectral distribution).

In some cases, at least some of the light 200 incident on the sample 104 may reflect from the sample 104 (e.g., in the form of reflected light 204). The first spectrometer 102a can measure the properties of the reflected light 204 using the photodetector 110a.

In some cases, at least some of the light 200 incident on the sample 104 may be transmitted through the sample 104 (e.g., in the form of transmitted light 206). The second spectrometer 102b can measure the properties of the transmitted light 206 using the photodetector 110b. In some cases, the measurements can be obtained with respect to a particular range of wavelengths $\lambda_{detected_1}$ to $\lambda_{detected_2}$. As an illustrative example, the measured properties of the transmitted light 206 can be represented as a histogram 400a (e.g., indicating the wavelengths of measured light along the horizontal axis, and the frequency or intensity of measured light on the vertical axis).

During a second phase of this operating mode (shown in FIG. 4B), the spectrometer system 100 operates in similar manner as described with respect to FIG. 3B. For example, the first spectrometer 102a discontinues emitting light 200, whereas, the second spectrometer 102b emits light 302 towards the sample 104 (e.g., using the light source 108b). Further, the second spectrometer 102b can emit the light 302 according to an axis of propagation 304 extending from the second light source 108*b* of the second spectrometer 102*b* to the photodetector 110*a* of the first spectrometer 102*a*. In some cases, the second spectrometer 102*b* can emit the light 302 according to the same wavelength or range of wavelengths as the light 200 emitted by the first spectrometer 102*a* (e.g., $\lambda_{emitted_1}$, or between $\lambda_{emitted_1}$ to $\lambda_{emitted_2}$) and/or according to the same spectral properties as the light 200 emitted by the first spectrometer 102*a*. In some cases, the second spectrometer 102*b* can emit the light 302 according to a different wavelength or range of wavelengths as the light 200 emitted by the first spectrometer 102*a* (e.g., $\lambda_{emitted_3}$, or between $\lambda_{emitted_3}$ to $\lambda_{emitted_4}$) and/or according to different spectral properties as the light 200 emitted by the first spectrometer 102*a*.

In some cases, at least some of the light 302 incident on the sample 104 may reflect from the sample 104 (e.g., in the form of reflected light 306). The second spectrometer 102*b* can measure the properties of the reflected light 306 using the photodetector 110*b*.

In some cases, at least some of the light 302 incident on the sample 104 may be transmitted through the sample 104 (e.g., in the form of transmitted light 308). The first spectrometer 102*a* can measure the properties of the transmitted light 308 using the photodetector 110*a*. In this example, the measurements can be obtained with respect to the range of wavelengths $\lambda_{detected_3}$ to $\lambda_{detected_4}$ different from the range of wavelengths of the measurements during the first phase. As an illustrative example, the measured properties of the transmitted light 308 can be represented as a histogram 400*b* (e.g., indicating the wavelengths of measured transmitted light along the horizontal axis, and the frequency or intensity of measured transmitted light on the vertical axis).

In some cases, the spectrometers 102*a* and 102*b* can measure light with respect to overlapping ranges of wavelengths. For example, the second spectrometer 102*b* can obtain measurements with respect to a particular range of wavelengths $\lambda_{detected_1}$ to $\lambda_{detected_2}$, whereas the first spectrometer 102*a* can obtain measurements with respect to a different range of wavelengths $\lambda_{detected_3}$ to $\lambda_{detected_4}$, where $\lambda_{detected_1} < \lambda_{detected_3} < \lambda_{detected_2} < \lambda_{detected_4}$.

In some cases, the spectrometers 102*a* and 102*b* can measure light with respect to non-overlapping ranges of wavelengths. For example, the second spectrometer 102*b* can obtain measurements with respect to a particular range of wavelengths $\lambda_{detected,1}$ to $\lambda_{detected_2}$, whereas the first spectrometer 102*a* can obtain measurements with respect to a different range of wavelengths $\lambda_{detected_3}$ to $\lambda_{detected_4}$, where $\lambda_{detected_1} < \lambda_{detected_2} < \lambda_{detected_3} < \lambda_{detected_4}$.

In some cases, the spectrometers 102*a* and 102*b* can measure light with respect to contiguous ranges of wavelengths. For example, the second spectrometer 102*b* can obtain measurements with respect to a particular range of wavelengths $\lambda_{detected,1}$ to $\lambda_{detected,2}$, whereas the first spectrometer 102*a* can obtain measurements with respect to a different range of wavelengths $\lambda_{detected_3}$ to $\lambda_{detected_4}$, where $\lambda_{detected_1} < \lambda_{detected_2} \leq \lambda_{detected_3} < \lambda_{detected_4}$.

The measurements obtained by the spectrometers 102*a* and 102*b* can be aggregated together. For example, the spectrometers 102*a* and 102*b* can transmit the measurements to the electronic control device 106 and/or to one another using their respective transceivers 112*a* and 112*b*. Further, the measurements can be combined together (e.g., added together to appended to one another) into a single data set. This can be useful, for example, as it increases the effective sample size of the measurements, and can improve the accuracy and/or precision of the measurements. Further, the data set can include samples spanning a wider range of wavelengths than might otherwise be obtained by a single spectrometer alone.

As an illustrative example, the measurements of the histogram 400*a* was obtained according to a range of wavelengths $\lambda_{detected_1}$ to $\lambda_{detected_2}$, whereas histogram 400*b* was obtained according to a range of wavelengths $\lambda_{detected_3}$ to $\lambda_{detected_4}$, where $\lambda_{detected_1} < \lambda_{detected_2} \leq \lambda_{detected_3} < \lambda_{detected_4}$. Thus, the measurements span across a contiguous range of wavelengths $\lambda_{detected_1}$ to $\lambda_{detected_4}$. These measurements can be added together to obtain a combined histogram 400*c*, with combined measurements within the contiguous range of wavelengths $\lambda_{detected_1}$ to $\lambda_{detected_4}$.

In some cases, the spectrometers 102*a* and 102*b* can alternate between emitting light and measuring transmitted light one or more times (e.g., alternate between the phases shown in FIGS. 4A and 4B one or more times). This can be useful, for example, as obtaining multiple samples can further increase the accurate and/or precision of the measurements. As an example, the spectrometers 102*a* and 102*b* can cycle between the two phases one, two, three, four, or more times.

Further, although FIGS. 4A and 4B only depict the aggregation of measurements with respect to transmitted light, measurements with respect to reflected light also can be aggregated in a similar manner. For example, during the first phase of this operating mode (e.g., as shown in FIG. 4A), the first spectrometer 102*a* can measure reflected light 204 using the photodetector 110*a*. Further, during the second phase of this operating mode (e.g., as shown in FIG. 4B), the second spectrometer 102*b* can measure reflected light 306 using the photodetector 110*b*. Similarly, the spectrometers 102*a* and 102*b* can measure the reflected light according to different ranges of wavelengths (e.g., overlapping ranges, non-overlapping ranges, continuous ranges, etc.). These measurements can be combined together. For instance, the measurements can be added together to obtain a combined histogram (e.g., with combined measurements within a wider range of wavelengths than obtained by either spectrometer alone).

In some cases, both of the spectrometers 102*a* and 102*b* can emit light concurrently toward the sample 104, while also both concurrently measuring light reflecting from and/or transmitted through the sample 104. This enables the spectrometer system 100 to better account for variations in the positioning of the sample 104 in the sample region 150.

For example, when both of the spectrometers 102*a* and 102*b* are concurrently emitting light towards the sample 104, the light measured by the spectrometers 102*a* and 102*b* is a combination of light reflected from the sample 104 and light transmitted through the sample 104. However, the measured light may vary based on the position of the sample 104 in the sample region 150. For example, if a sample 104 is positioned closer to the first spectrometer 102*a*, it may reflect light emitted by the first spectrometer 102*a* back toward the first spectrometer 102*a* in a particular way. However, if the sample 104 is positioned further from the first spectrometer 102*a*, it may reflect light emitted by the first spectrometer 102*a* back toward the first spectrometer 102*a* in a different way (e.g., due to differences in the scattering of light by the sample 104 and the differences in the light paths between the sample 104 and the first spectrometer 102*a*). Similarly, the sample 104 may reflect light emitted by the second spectrometer 102*b* differently, depending on the position of the sample 104. In contrast, if the light emitted by the spectrometers 102*a* and 102*b* is collimated (e.g., emitted as parallel or substantially parallel light rays), the light transmitted through the sample 104 will not vary substantially due to the difference in position. Thus, variations in the measured light can be correlated to the change in position of the sample 104 within the sample region 150.

Further, in some cases, a change in position of the sample 104 within the sample region 150 may result in substantially equal and opposite changes in the measured light by the spectrometers. For instance, if the object is moved further away from the first spectrometer 102a, the light measured by the spectrometer 102a may decrease by a particular amount (e.g., as less reflected light is scattered onto the photodetector 110a due to the increased distance between the sample 104 and the photodetector 110a). Correspondingly, the light measured by the spectrometer 102b may increase by substantially the same amount (e.g., as less reflected light is scattered onto the photodetector 110a due to the decreased distance between the sample 104 and the photodetector 110a). These equal and opposite changes can be used to more robustly identify variations in the measured spectral properties of light due to variations in sample positioning, rather than due to physical, chemical, compositional, or other variations in the sample itself. Thus, the characteristics of the sample can be analyzed more accurately and/or precisely.

Figure 5:
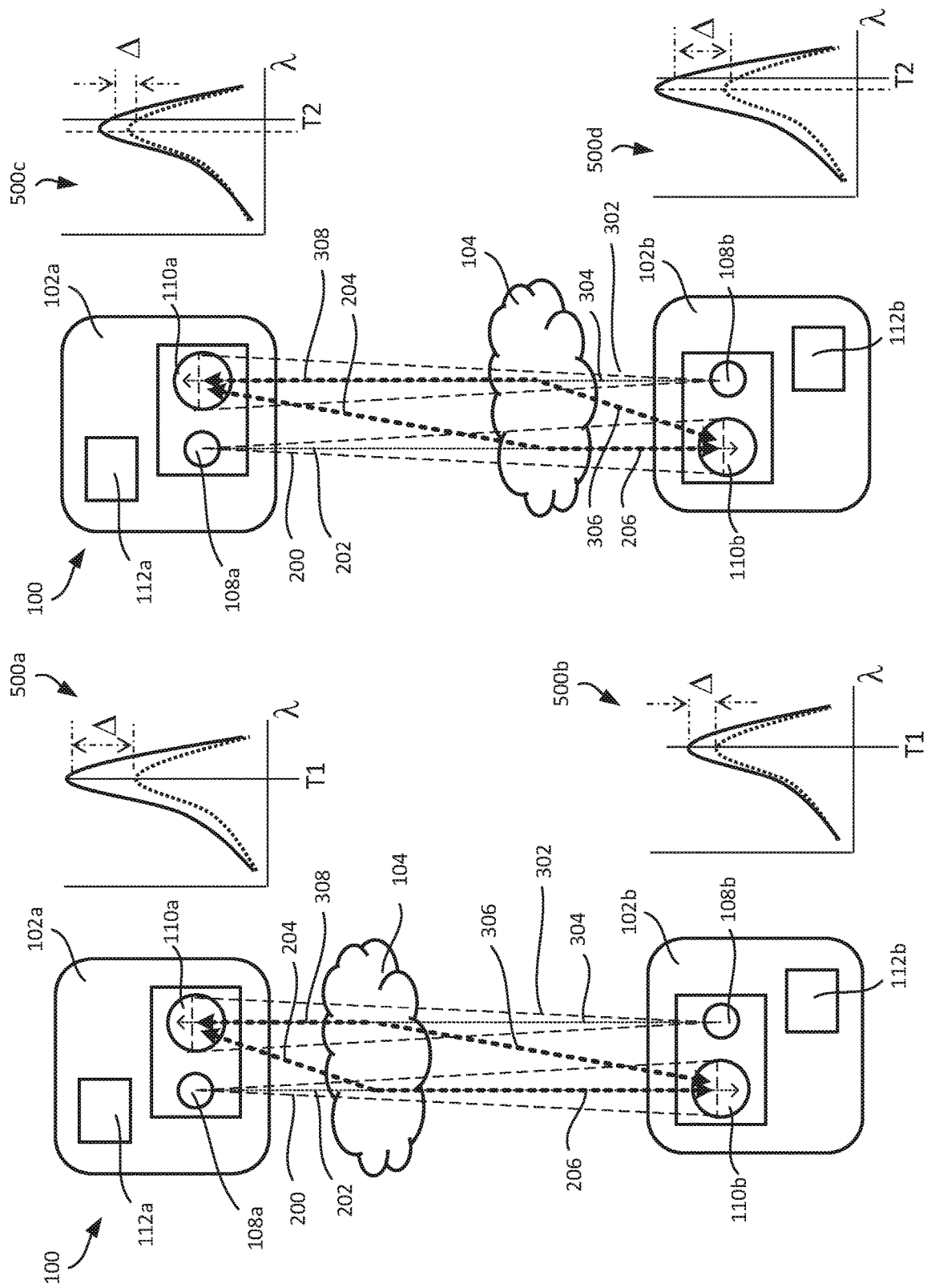
FIGS. 5A and 5B are schematic diagrams of another example operating mode of a spectrometer system.

For example, FIGS. 5A and 5B show the spectrometer system 100 operating according to another mode of operation to analyze both the light reflected by the sample 104 and the light transmitted by the sample 104. For ease of illustration, portions of the spectrometer system 100 (e.g., the electronic control device 106) have been omitted in FIGS. 5A and 5B.

FIG. 5A shows the operation of the spectrometer system 100 when the sample 104 is positioned at a first position between the spectrometers 102a and 102b (e.g., closer to the first spectrometer 102a than to the second spectrometer 102b). The first spectrometer 102a emits light 200 towards the sample 104 (e.g., positioned in the sample region 150 between the first spectrometer 102a and the second spectrometer 102b). Further, the first spectrometer 102a can emit the light 200 according to an axis of propagation 202 extending from the light source 108a of the first spectrometer 102a to the photodetector 110b of the second spectrometer 102b. In some cases, the first spectrometer 102a can emit the light 200 according to a particular wavelength (e.g., $\lambda_{emitted_1}$) or range of wavelengths (e.g., between $\lambda_{emitted_1}$ to $\lambda_{emitted_2}$) and/or according to other particular spectral properties (e.g., a particular spectral distribution). Further, the emitted light 200 can be collimated light.

In some cases, at least some of the light 200 incident on the sample 104 may reflect from the sample 104 (e.g., in the form of reflected light 204). The first spectrometer 102a can measure the properties of the reflected light 204 using the photodetector 110a. Further, in some cases, at least some of the light 200 incident on the sample 104 may be transmitted through the sample 104 (e.g., in the form of transmitted light 206). The second spectrometer 102b can measure the properties of the transmitted light 206 using the photodetector 110b.

Concurrently, the second spectrometer 102b can emit the light 302 according to an axis of propagation 304 extending from the second light source 108b of the second spectrometer 102b to the photodetector 110a of the first spectrometer 102a. In some cases, the second spectrometer 102b can emit the light 302 according to the same wavelength or range of wavelengths as the light 200 emitted by the first spectrometer 102a (e.g., $\lambda_{emitted_1}$, or between $\lambda_{emitted_1}$ to $\lambda_{emitted_2}$) and/or according to the same spectral properties as the light 200 emitted by the first spectrometer 102a. In some cases, the second spectrometer 102b can emit the light 302 according to a different wavelength or range of wavelengths as the light 200 emitted by the first spectrometer 102a (e.g., $\lambda_{emitted_3}$, or between $\lambda_{emitted_3}$ to $\lambda_{emitted_4}$) and/or according to different spectral properties as the light 200 emitted by the first spectrometer 102a. Further, the emitted light 302 also can be collimated light.

In some cases, at least some of the light 302 incident on the sample 104 may reflect from the sample 104 (e.g., in the form of reflected light 306). The second spectrometer 102b can measure the properties of the reflected light 306 using the photodetector 110b. Further, in some cases, at least some of the light 302 incident on the sample 104 may be transmitted through the sample 104 (e.g., in the form of transmitted light 308). The first spectrometer 102a can measure the properties of the transmitted light 308 using the photodetector 110a.

As light is concurrently emitted by both of the spectrometers 102a and 102b, the light measured by the spectrometers 102a and 102b during this time is a combination of light reflected from the sample 104 and light transmitted through the sample 104. Further, as the light emitted by the spectrometers 102a and 102b is collimated, the measured transmitted light does not depend on the position of the sample 104 (e.g., relative to the spectrometers 102a and 102b), whereas the measured reflected light correlates to the position of the sample 104.

As an illustrative example, the light measured by the first spectrometer 102a can be represented as a histogram 500a (e.g., indicating the wavelengths of measured transmitted light along the horizontal axis, and the frequency or intensity of measured transmitted light on the vertical axis). The total measured light is indicated by a solid line, the contribution of the transmitted light is indicated by a dotted line, and the contribution of the reflected light is indicated by the change Δ. Similarly, the light measured by the second spectrometer 102b can be represented as a histogram 500b (e.g., indicating the wavelengths of measured transmitted light along the horizontal axis, and the frequency or intensity of measured transmitted light on the vertical axis). Likewise, the total measured light is indicated by a solid line, the contribution of the transmitted light is indicated by a dotted line, and the contribution of the reflected light is indicated by the change Δ. As shown in FIG. 5A, the intensity of light measured by the first spectrometer 102a is greater than the intensity of light measured by the second spectrometer 102b (e.g., due to the proximity between the sample 104 and the first spectrometer 102a). However, the contribution of the transmitted light is substantially similar between the two measurements.

The light measured by the spectrometers 102a and 102b may vary, depending on the position of the sample 104. For example, FIG. 5A shows the operation of the spectrometer system 100 when the sample 104 is positioned at a second position between the spectrometers 102a and 102b (e.g., closer to the second spectrometer 102b than to the second spectrometer 102a). In a similar manner as described with respect to FIG. 5A, the first spectrometer 102a emits light 200 towards the sample 104. Further, the first spectrometer 102a can emit the light 200 according to an axis of propagation 202 extending from the light source 108a of the first spectrometer 102a to the photodetector 110b of the second spectrometer 102b. In some cases, the first spectrometer 102a can emit the light 200 according to a particular wavelength (e.g., $\lambda_{emitted_1}$) or range of wavelengths (e.g., between $\lambda_{emitted_1}$ to $\lambda_{emitted_2}$) and/or according to other particular spectral properties (e.g., a particular spectral distribution). Further, the emitted light 200 can be collimated light.

Likewise, in some cases, at least some of the light 200 incident on the sample 104 may reflect from the sample 104 (e.g., in the form of reflected light 204). The first spectrometer 102a can measure the properties of the reflected light 204 using the photodetector 110a. Further, in some cases, at least some of the light 200 incident on the sample 104 may be transmitted through the sample 104 (e.g., in the form of transmitted light 206). The second spectrometer 102b can measure the properties of the transmitted light 206 using the photodetector 110b.

Further, in a similar manner as described with respect to FIG. 5A, concurrently, the second spectrometer 102b can emit the light 302 according to an axis of propagation 304 extending from the second light source 108b of the second spectrometer 102b to the photodetector 110a of the first spectrometer 102a. In some cases, the second spectrometer 102b can emit the light 302 according to the same wavelength or range of wavelengths as the light 200 emitted by the first spectrometer 102a (e.g., $\lambda_{emitted_1}$, or between $\lambda_{emitted_1}$ to $\lambda_{emitted_2}$) and/or according to the same spectral properties as the light 200 emitted by the first spectrometer 102a. In some cases, the second spectrometer 102b can emit the light 302 according to a different wavelength or range of wavelengths as the light 200 emitted by the first spectrometer 102a (e.g., $\lambda_{emitted_3}$, or between $\lambda_{emitted_3}$ to $\lambda_{emitted_4}$) and/or according to different spectral properties as the light 200 emitted by the first spectrometer 102a. Further, the emitted light 302 also can be collimated light.

Likewise, in some cases, at least some of the light 302 incident on the sample 104 may reflect from the sample 104 (e.g., in the form of reflected light 306). The second spectrometer 102b can measure the properties of the reflected light 306 using the photodetector 110b. Further, in some cases, at least some of the light 302 incident on the sample 104 may be transmitted through the sample 104 (e.g., in the form of transmitted light 308). The first spectrometer 102a can measure the properties of the transmitted light 308 using the photodetector 110a.

Similarly, as light is concurrently emitted by both of the spectrometers 102a and 102b, the light measured by the spectrometers 102a and 102b during this time is a combination of light reflected from the sample 104 and light transmitted through the sample 104. As the light emitted by the spectrometers 102a and 102b is collimated, the measured transmitted light does not depend on the position of the sample 104 (e.g., relative to the spectrometers 102a and 102b), whereas the measured reflected light correlates to the position of the sample 104. However, the measured reflected light differs, due to the differences in the scattering of light by the sample 104 and the differences in the light paths between the sample 104 and the spectrometers 102a and 102b.

As an illustrative example, the light measured by the first spectrometer 102a can be represented as a histogram 500c (e.g., indicating the wavelengths of measured transmitted light along the horizontal axis, and the frequency or intensity of measured transmitted light on the vertical axis). The total measured light is indicated by a solid line, the contribution of the transmitted light is indicated by a dotted line, and the contribution of the reflected light is indicated by the change Δ. Similarly, the light measured by the second spectrometer 102b can be represented as a histogram 500d (e.g., indicating the wavelengths of measured transmitted light along the horizontal axis, and the frequency or intensity of measured transmitted light on the vertical axis). Likewise, the total measured light is indicated by a solid line, the contribution of the transmitted light is indicated by a dotted line, and the contribution of the reflected light is indicated by the change Δ. As shown in FIG. 5B, the intensity of light measured by the first spectrometer 102a is less than the intensity of light measured by the second spectrometer 102b (e.g., due to the proximity between the sample 104 and the second spectrometer 102b). However, the contribution of the transmitted light is substantially similar between the two measurements obtained while the sample 104 was positioned at the second position (as shown in FIG. 5B), as well as to the two measurements obtained while the sample 104 was positioned at the first position (as shown in FIG. 5A). Further, the change in intensity measurements obtained by the first spectrometer 102a (e.g., the change in measurements from the histogram 500a to the histogram 500c) is substantially equal and opposite to the change in intensity measurements obtained by the second spectrometer 102b (e.g., the change in measurements from the histogram 500b to the histogram 500d).

The measurements obtained by the spectrometers 102a and 102b can be aggregated together. For example, the spectrometers 102a and 102b can transmit the measurements to the electronic control device 106 and/or to one another using their respective transceivers 112a and 112b.

These variations in the measured light can be correlated with the change in position of the sample 104 within the sample region 150. For example, an increase in the measured intensity of light by a first spectrometer 102a accompanied by a decrease in measured intensity of light by a second spectrometer 102b can indicate that the sample 104 is positioned closer to the first spectrometer 102a than to the second spectrometer 102b. Further, a high magnitude increase in the measured intensity of light by a first spectrometer 102a can indicate that the sample 104 is positioned closer to the first spectrometer 102a, whereas a lower magnitude increase in the measured intensity of light by a first spectrometer 102a can indicate that the sample 104 is positioned further from the first spectrometer 102a. In some cases, these correlations can be used to estimate the position of the sample 104 relative to the spectrometers 102a and 102b. For example, the correlation between the changes in magnitude of the measured light and the changes in distance can be determined empirically (e.g., a proportional relationship, or some other relationship). The correlation can be used in subsequent measurements to estimate the position of the sample 104 (e.g., using the electronic control device 106).

Further, these variations in the measured light can be used to correct and/or calibrate measurements obtained by the spectrometer system 100. For example, during the measurement process, the sample 104 may move one or more times (e.g., due to the user shifting the sample 104 relative to the spectrometers 102a and 102b, jostling of the spectrometer system 100, etc.). This results in "ripples" in the measurements by the spectrometers 102a and 102b (e.g., increases and/or decreases in the measured intensity of light as the sample 104 is moved closer to one spectrometer relative to another). To account for these movements, the spectrometer system 100 can obtain multiple measurements over a period of time. Using the electronic control device 106, the spectrometer system 100 can identify the variations in the measurements, and attribute those variations to the movement of the sample 104 (e.g., rather than variations in the properties of the sample 104 itself). Using the electronic control device 106, the spectrometer system 100 can correct or calibrate these measurements to remove or otherwise reduce the movement-related variations in the measurements. Thus, the characteristics of the sample can be analyzed more accurately and/or precisely, even if the sample is shifted during the measurement process.

In practice, the spectrometer system 100 can have different physical configurations, depending on the implementation. In some cases, the spectrometer system 100 can be implemented as a stand-alone device (e.g., as an individual instrument), or as part of another device (e.g., as a part of a multi-purpose device). In some cases, the spectrometer system 100 can be implemented as a part of a mobile device, such as a smart phone, a tablet computer, or a wearable computer. In some cases, the positions of the spectrometers 102a and 102b can be fixed relative to one another and the sample region 150. In some cases, the sample region 150 can include a receptacle (e.g., a cup, a bin, a slot, etc.) to receive the sample 104 and secure it relative to the spectrometers 102a and 102b.

In some cases, the spectrometer system 100 can be implemented using multiple different mobile devices. For example, the first spectrometer 102a can be implemented as a part of a first mobile device, and the second spectrometer 102b can be implemented as a part of a second mobile device. Users can position the first and second mobile devices such that the spectrometers 102a and 102b are facing each other, place a sample between the spectrometers 102a and 102b, and use the spectrometers 102a and 102b to obtain one or more measurements. In this configuration, the electronic control device 106 can be implemented as a part of the first mobile device, the second mobile device, and/or one or more other devices (e.g., a client computer system or a server computer system).

Example Processes

Figure 6:
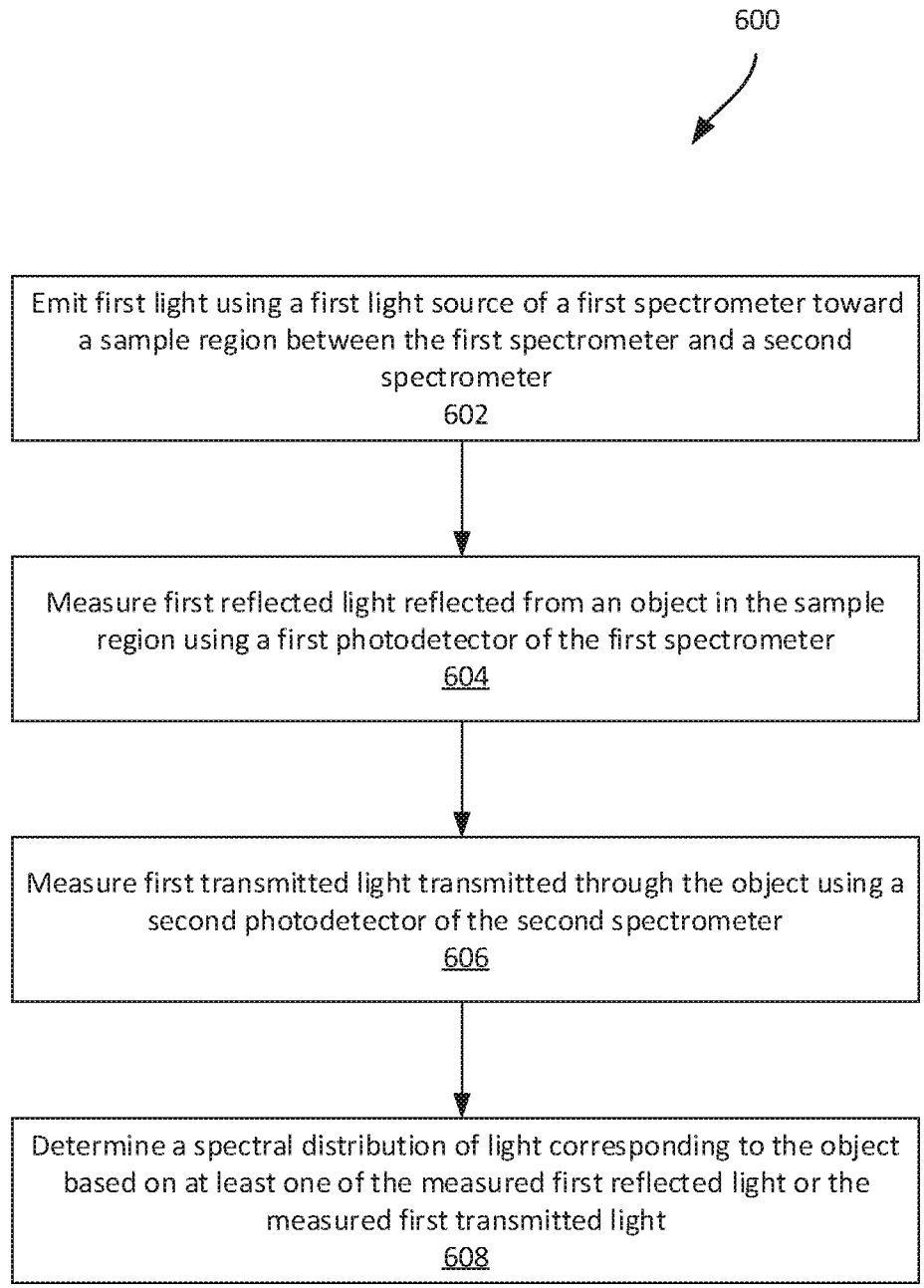
FIG. 6 is a flowchart diagram of an example process for obtaining measurements using a spectrometer system.

An example process 600 for using a spectrometer system is shown in FIG. 6. The process 600 can be performed to measure a spectral distribution of light reflected from and/or transmitted through a sample. In some cases, the process 600 can be performed by one or more of the spectrometer systems shown in FIGS. 1-5.

In the process 600, a first spectrometer and a second spectrometer are obtained (step 602). The first spectrometer includes a first light source and a first photodetector. The second spectrometer includes a second spectrometer comprising a second light source and a second photodetector. Example spectrometer systems includes multiple spectrometers are shown and described with respect to FIGS. 1-5.

First light is emitted towards a sample region between the first spectrometer and the second spectrometer using the first light source of the first spectrometer (step 604). In some cases, the sample can be an object or other subject to be analyzed by the spectrometer system.

First reflected light reflected from an object in the sample region is measured using the first photodetector of the first spectrometer (step 606). As an example, the first photodetector can measure the spectral characteristics of the reflected light.

First transmitted light transmitted through the object is measured by the second photodetector of the second spectrometer (step 608). As an example, the second photodetector can measure the spectral characteristics of the transmitted light. In some cases, the first and second photodetectors can obtain measurements with respect to a common wavelength or range of wavelengths of light. In some cases, the first and second photodetectors can obtain measurements with respect to different wavelengths or ranges of wavelengths of light (e.g., overlapping ranges, non-overlapping ranges, continuous ranges, etc.).

A spectral distribution of light corresponding to the object is determined using an electronic control device based on at least one of the measured first reflected light or the measured first transmitted light (step 610).

In some cases, measurements can also be obtained while light is emitted by the second light source. For example, second light can be emitted towards the sample region using the second light source of the second spectrometer. The second reflected light reflected from the object can be measured using the second photodetector of the second spectrometer. Further, the second transmitted light transmitted through the object can be measured using the first photodetector of the first spectrometer. The spectral distribution of light corresponding to the object can be determined using the electronic control device based further on at least one of the measured second reflected light or the measured second transmitted light In some cases, the first light and the second light can be emitted during different time periods. For example, the first light can be emitted by the first light source during a first time period, and the second light can be emitted by the second light source during a second time period different from the first time period.

In some cases, the first light can be emitted by the first light source concurrently with the second light source emitting the second light. Further, the spectral distribution of light corresponding to the object can be determined by determining, at a first time, a first combination of the second transmitted and the first reflected light using the first photodetector, and determining, at the first time, a first combination of the first transmitted light and the second reflected light using the second photodetector. Further, a second combination of the second transmitted light and the first reflected light can be determined at a second time using the first photodetector, and a second combination of the first transmitted light and the second reflected light reflected from the object can be determined at the second time, using the second photodetector. Further, a first variation between (i) the first combination of the second transmitted and the first reflected light and (ii) the second combination of the second transmitted light and the first reflected light can be determined using the first photodetector. Further, a second variation between (i) first combination of the first transmitted light and the second reflected light using the second photodetector and (ii) the second combination of the first transmitted light and the second reflected light reflected from the object can be determined using the second photodetector. A correlation between the first variation and the second variation can be determined, and the spectral distribution of light can be determined based on the correlation. Examples of this technique are described with respect to FIGS. 5A and 5B.

In some cases, the first light can be emitted by the first light source within a first range of wavelengths, and the second light can be emitted by the second light source within a second range of wavelengths different from the first range of wavelengths.

In some cases, the first light can be emitted by the first light source within a first range of wavelengths, and the second light can be emitted by the second light source within the first range of wavelengths.

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the spectrometer system 100 (e.g., the electronic control device 106) can be implemented using digital electronic circuitry, or in computer software, firmware, or hardware, or in combinations of one or more of them. In another example, the processes shown in FIG. 6 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 7:
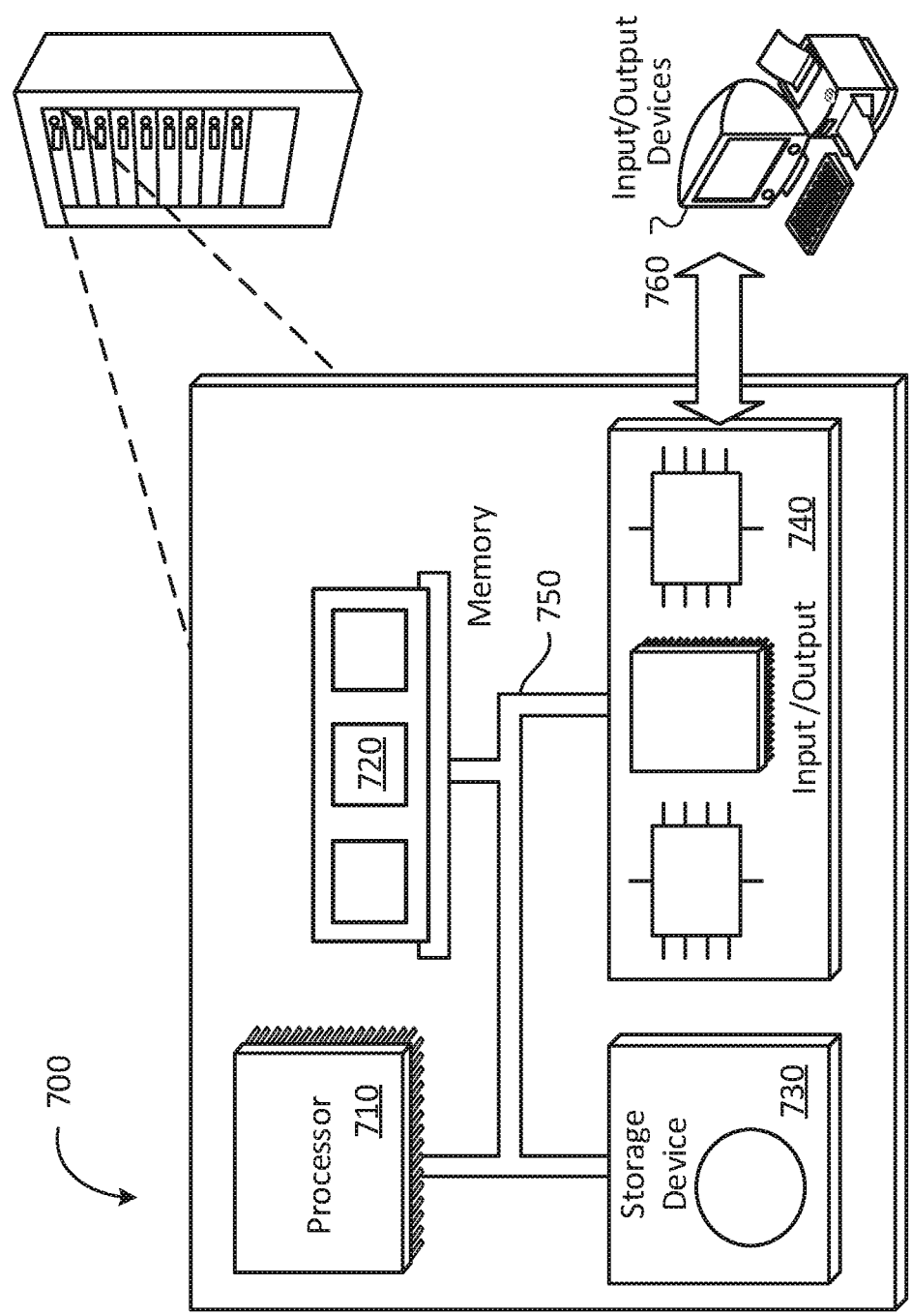
FIG. 7 is a schematic diagram of an example computer system.

FIG. 7 shows an example computer system 700 that includes a processor 710, a memory 720, a storage device 730 and an input/output device 740. Each of the components 710, 720, 730 and 740 can be interconnected, for example, by a system bus 750. In some implementations, the computer system 700 can be used to control the operation of a spectrometer. For example, the electronic control device 106 shown in FIG. 1 can include a computer system 700 to control the operation of one or more components of a spectrometer and/or process measurement data. The processor 710 is capable of processing instructions for execution within the system 700. In some implementations, the processor 710 is a single-threaded processor, a multi-threaded processor, or another type of processor. The processor 710 is capable of processing instructions stored in the memory 720 or on the storage device 730. The memory 720 and the storage device 730 can store information within the system 700.

The input/output device 740 provides input/output operations for the system 700. In some implementations, the input/output device 740 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 760. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications may be made without departing from the spirit and scope of the invention. Accordingly, other embodiments are within the scope of the claims.

The invention claimed is:

1. A system comprising:
a first spectrometer comprising:
a first light source comprising one or more light-emitting diodes (LEDs), vertical cavity surface emitting lasers (VCSELs), organic LEDs, or combinations thereof;
a first photodetector;
a second spectrometer comprising:
a second light source comprising one or more light-emitting diodes (LEDs), vertical cavity surface emitting lasers (VCSELs), organic LEDs, or combinations thereof;
a second photodetector; and
an electronic control device communicatively coupled to the first spectrometer and the second spectrometer,
wherein the first light source is operable to emit first light towards a sample region between the first spectrometer and the second spectrometer, wherein the first light emitted from the first light source is ultraviolet light, visible light, or infrared light,
wherein the first photodetector is operable to measure first reflected light reflected from an object in the sample region,
wherein the second photodetector is operable to measure first transmitted light transmitted through the object, and
wherein the electronic control device is operable to determine, based on at least one of the measured first reflected light or the measured first transmitted light, a spectral distribution of light corresponding to the object.

2. The system of claim 1,
wherein the second light source is operable to emit second light towards the sample region,
wherein the second photodetector is operable to measure second reflected light reflected from the object,
wherein the first photodetector is operable to measure second transmitted light transmitted through the object, and
wherein the electronic control device is operable to determine, based further on at least one of the measured second reflected light or the measured second transmitted light, the spectral distribution of light corresponding to the object.

3. The system of claim 2, wherein the first light source is operable to emit the first light during a first time period, and wherein the second light source is operable to emit the second light during a second time period different from the first time period.

4. The system of claim 2, wherein the first light source is operable to emit the first light concurrently with the second light source emitting the second light.

5. The system of claim 1, wherein the electronic control device is operable to determine the spectral distribution of light corresponding to the object by:
determining, at a first time, a first combination of the second transmitted and the first reflected light using the first photodetector; and
determining, at the first time, a first combination of the first transmitted light and the second reflected light using the second photodetector.

6. The system of claim 5, wherein the electronic control device is operable to determine the spectral distribution of light corresponding to the object by:
determining, at a second time, a second combination of the second transmitted light and the first reflected light using the first photodetector; and
determining, at the second time, a second combination of the first transmitted light and the second reflected light reflected from the object using the second photodetector.

7. The system of claim 6, wherein the electronic control device is operable to determine the spectral distribution of light corresponding to the object by:
determining a first variation between (i) the first combination of the second transmitted and the first reflected light and (ii) the second combination of the second transmitted light and the first reflected light using the first photodetector; and
determining a second variation between (i) the first combination of the first transmitted light and the second reflected light using the second photodetector and (ii) the second combination of the first transmitted light and the second reflected light reflected from the object using the second photodetector.

8. The system of claim 7, wherein the electronic control device is operable to determine the spectral distribution of light corresponding to the object by:
determining a correlation between the first variation and the second variation; and
determining the spectral distribution of light based on the correlation.

9. The system of claim 1, wherein the first light source is operable to emit the first light within a first range of wavelengths, and wherein the second light source is operable to emit second light within a second range of wavelengths different from the first range of wavelengths.

10. The system of claim 1, wherein the first light source is operable to emit the first light within a first range of wavelengths, and
wherein the second light source is operable to emit the second light within the first range of wavelengths.

11. The system of claim 1, further comprising a receptacle disposed in the sample region, the receptacle being configured to hold the object.

12. The system of claim 1, wherein the system comprises a mobile device comprising at least one of the first spectrometer or the second spectrometer.

13. The system of claim 1, wherein the system comprises a first mobile device comprising the first spectrometer, and a second mobile device comprising the second spectrometer.

14. A method comprising:
emitting, using a first light source of a first spectrometer, first light towards a sample region between the first spectrometer and a second spectrometer; wherein the first light emitted from the first light source is ultraviolet light, visible light, or infrared light;
wherein the first light source comprises one or more light-emitting diodes (LEDs), vertical cavity surface emitting lasers (VCSELs), organic LEDs, or combinations thereof;
measuring, using a first photodetector of the first spectrometer, first reflected light reflected from an object in the sample region;
measuring, using a second photodetector of the second spectrometer, first transmitted light transmitted through the object; and
determining, using an electronic control device, a spectral distribution of light corresponding to the object based on at least one of the measured first reflected light or the measured first transmitted light.

15. The method of claim 14, further comprising:
emitting, using a second light source of the second spectrometer, second light towards the sample region;
wherein the second light source comprises one or more light-emitting diodes (LEDs), vertical cavity surface emitting lasers (VCSELs), organic LEDs, or combinations thereof;
measuring, using the second photodetector of the second spectrometer, second reflected light reflected from the object;

measuring, using the first photodetector of the first spectrometer, second transmitted light transmitted through the object; and
determining, using the electronic control device, the spectral distribution of light corresponding to the object based further on at least one of the measured second reflected light or the measured second transmitted light.

16. The method of claim 15, wherein the first light is emitted by the first light source during a first time period, and wherein the second light is emitted by the second light source during a second time period different from the first time period.

17. The method of claim 15, wherein the first light is emitted by the first light source concurrently with the second light source emitting the second light.

18. The method of claim 17, wherein determining the spectral distribution of light corresponding to the object comprises:
determining, at a first time, a first combination of the second transmitted and the first reflected light using the first photodetector; and
determining, at the first time, a first combination of the first transmitted light and the second reflected light using the second photodetector.

19. The method of claim 18, wherein determining the spectral distribution of light corresponding to the object comprises:
determining, at a second time, a second combination of the second transmitted light and the first reflected light using the first photodetector; and
determining, at the second time, a second combination of the first transmitted light and the second reflected light reflected from the object using the second photodetector.

20. The method of claim 19, wherein determining the spectral distribution of light corresponding to the object comprises:
determining a first variation between (i) the first combination of the second transmitted and the first reflected light and (ii) the second combination of the second transmitted light and the first reflected light using the first photodetector; and
determining a second variation between (i) the first combination of the first transmitted light and the second reflected light using the second photodetector and (ii) the second combination of the first transmitted light and the second reflected light reflected from the object using the second photodetector.

* * * * *